United States Patent [19]
Donovan
[11] 3,902,190
[45] Aug. 26, 1975

[54] PROGRAMMABLE TEST OF READ/WRITE CIRCUITRY BY VARYING CLIPPING LEVELS

[75] Inventor: William Henry Donovan, Moorestown, N.J.
[73] Assignee: RCA Corporation, New York, N.Y.

[22] Filed: Nov. 23, 1973
[21] Appl. No.: 418,778

[52] U.S. Cl. .................................................. 360/39
[51] Int. Cl. .............................................. G11b 5/09
[58] Field of Search .............. 360/39, 46, 53, 27, 31

[56] References Cited

UNITED STATES PATENTS 3,483,542 12/1969 Jensen .................................. 360/39

Primary Examiner—Vincent P. Canney
Attorney, Agent, or Firm—Edward J. Norton; Carl M. Wright

[57] ABSTRACT

Circuit for varying clipping levels in information reading systems by storing a binary value in a register indicative of the desired clipping level and decoding the register contents into a corresponding clipping level voltage.

4 Claims, 7 Drawing Figures

PROGRAMMABLE TEST OF READ/WRITE CIRCUITRY BY VARYING CLIPPING LEVELS

BACKGROUND OF THE INVENTION

High speed data storage devices that operate as input or output equipment for fast computers are complex electrical and mechanical machines. They require critical adjustments that change during use and which must be checked periodically. If not kept in correct adjustment, the performance of a device may degrade to the point of failure.

A large computer system will include many such devices. The effective use of such large systems does not provide sufficient time to check every device as often as might be necessary. It is inconvenient to stop the operation of the system to replace the device for off-line checking. Such a procedure not only requires frequent interruptions of system operation but also requires additional devices, which are usually expensive. Multiprocessing and time-sharing computer systems can be programmed to check the input and output devices if the devices are designed for this purpose.

Most devices use threshold reading circuits for noise immunity. The threshold levels at which errors occur give an indication of the condition of the devices' read and write circuitry. A device in accordance with the present invention having an error detecting system such as parity checking together with provisions for varying the threshold voltages can be tested by changing the threshold voltages until a reading error occurs. The voltages at which the errors occur can be analyzed to determine whether a device is operating within proper tolerances.

Furthermore, a device that has variable threshold capabilities as described herein can be used during program execution to overcome reading errors, thereby avoiding the problems associated with the failures such as repositioning tapes and re-initializing program counters. For example, if a read error occurs during the execution of a program, an interrupt can be activated to read the message with a different threshold voltage. Several voltages can be tried until a message is read without an error.

SUMMARY OF THE INVENTION

An information storage system is provided with reading circuitry having a voltage level for rejecting noise. The voltage level is variable and the value is selected to reject invalid information.

DETAILED DESCRIPTION OF THE INVENTION

Figure 1:
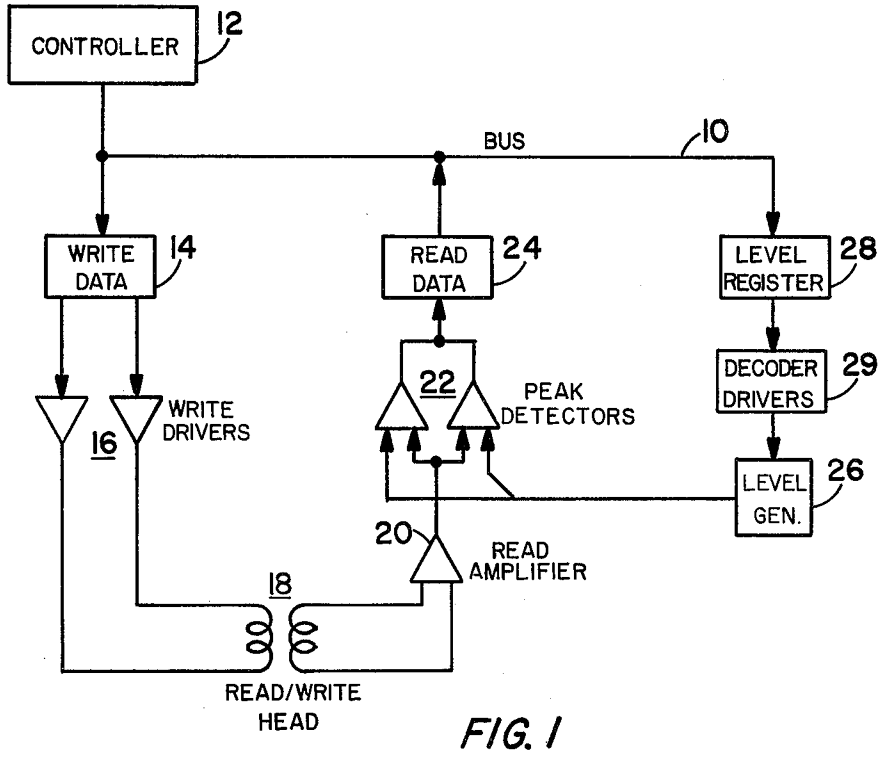
FIG. 1 is a block diagram of an embodiment of the invention.

In FIG. 1, a bus 10 comprising a plurality of conductors couples storage devices to a controller 12. The registers of only one device are shown in the configuration, which is typical of a tape, disc, or drum storage device wherein the data is stored on a magnetic surface that passes in close proximity to a read and write magnetic head 18.

Information to be stored on the magnetic surface is transmitted by the controller 12 to the write data register 14 via the bus 10. The information is usually in binary form and there is a register stage for each binary bit as well as a separate winding on the magnetic head 18. Only one stage, one winding, and so on are illustrated in FIG. 1.

The information in the write data register 14 is amplified and gated by the write drivers 16 which produce sufficient current through the write coils of the magnetic head to change the magnetic domains in the surface on which the information is to be stored.

The magnetic domains on the surface passing under the read coils of the magnetic head 18 induce voltages therein which are amplified by the read amplifiers 20. The output signals from the read amplifiers 20 are coupled to the peak detectors 22. The peak detectors are shown in pairs, one being used to detect the high peaks and the other to detect the low peaks.

Another input signal to the peak detectors 22 is a clipping, or threshold, level. The clipping level generator 26 generates a high and a low threshold level. Some devices use only one — usually a low — clipping level. The clipping level is used to reject signals having magnitudes equal to or less than the clipping level to prevent low level noise signals from being processed as information signals by the read circuits.

The output signals from the peak detectors 22 are stored temporarily in the read data register 24 for subsequent transfer to the controller 12 via the bus 10. While stored in the read data register 24, the information can be checked for correct parity, for proper coding, or other error detecting checks. Alternatively, a buffer register can be interposed between each of the peak detectors 22 and the read data register 24 as described below.

The clipping level is determined by a binary number transmitted over the bus 10 from the controller 12 to a level register 28. The clipping level number in the register 28 is coupled to a decoder 29. The output signal of the decoder 29 determines the clipping level.

The details of various parts of FIG. 1 will be described to show an example of their implementations. The registers, write drivers 16, read amplifiers 20, and the controller 12 are well known in the art and need not be described in detail for an understanding of the invention.

Figure 2:
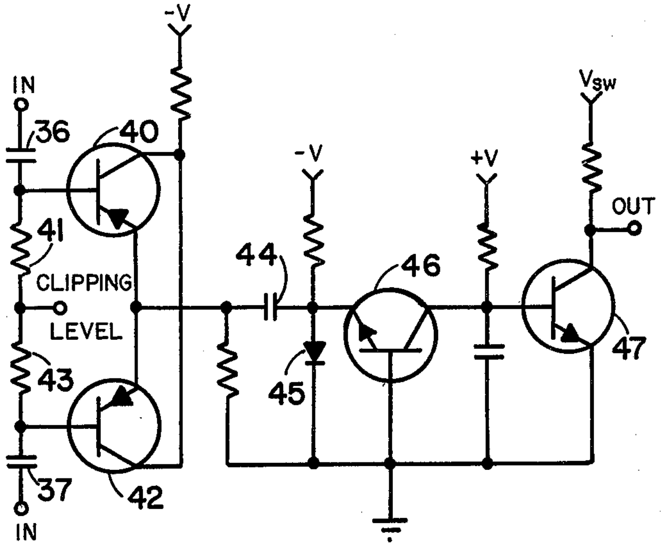
FIG. 2 is a schematic of a circuit using a clipping level.

FIG. 2 is a circuit diagram of a simple peak detector. The clipping level voltage establishes the bias on the transistors 40 and 42 through the resistors 41 and 43, respectively. The output signals from a double-ended read amplifier are coupled to the transistors 40 and 42 through the capacitors 36 and 37, respectively. The use of double-ended amplifiers produces unipolar output pulses regardless of the orientation of the magnetic domains representing the stored information.

The AC component of the signals from the read amplifier must be greater than the clipping voltage plus the base-to-emitter voltage drop of the transistors to turn on one of the transistors 40 or 42. The output signal from the emitters of the transistors 40 and 42 is coupled through a capacitor 44 to the emitter of a transistor 46. The base of the transistor 46 is grounded and the emitter is coupled to ground through a diode 45.

When the signal into the emitter of the transistor 46 is a voltage equal to or greater than $-V_{be}$ of the transistor, the transistor 46 will be turned off so that its collector voltage rises to +V, causing the collector voltage of the transistor 47 to fall to ground.

The signal through the capacitor 44 can rise above ground only by an amount equal to the forward drop across the diode 45. If the input signal rises higher than that voltage, the circuit voltages remain the same.

When the input signal begins to decrease, the transistor 46 will be turned on and its collector voltage will fall to ground, causing the collector voltage of the transistor 47 to rise to $V_{se}$. The output signal will be a positive-going voltage when a peak voltage exceeding the clipping level has occurred. This positive-going voltage can be converted to a pulse to set the read data register.

If the peak detectors produce valid information with a relatively high clipping level, the circuits and read amplifiers can be considered to be operating properly. If the clipping level must be reduced to produce valid information, the write circuits may not be producing enough current to store a strong signal or the gain of the read amplifiers may have decreased.

In a system using two clipping levels, the data from each peak detector is temporarily stored in a separate register. If one of the registers contains valid data, e.g. good parity, its contents are gated into the read data register. If both contain valid data, the high clipping level data is gated into the read data register. If both contain invalid data, then a read error is deemed to have occurred. During a write, an error is deemed to occur if either register has invalid data.

Figure 3:
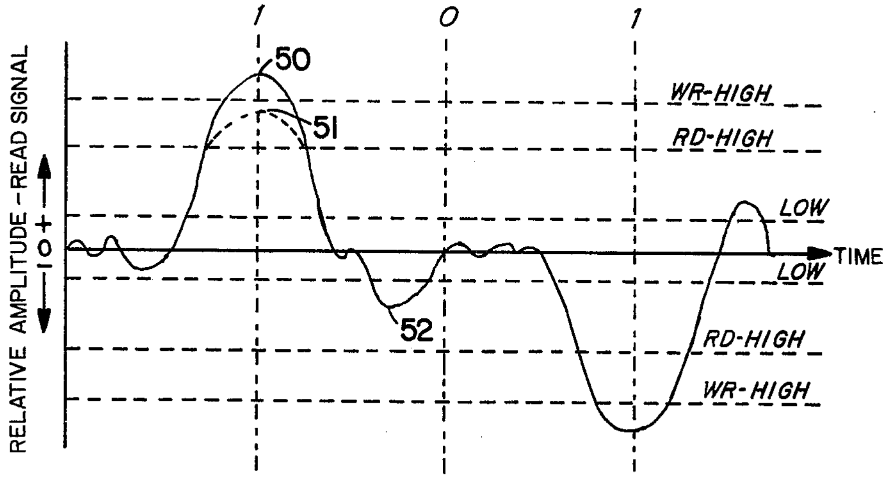
FIG. 3 is a graph of voltages versus time in the read circuitry.

FIG. 3 is a graph of the voltage output signal of a magnetic read head plotted against time. The solid line shows a possible signal that might result from reading a binary one signal followed by binary zero and binary one signals. As noted above, the read head output signal can be bidirectional because of the double-ended read amplifiers.

Several clipping levels are shown as dotted lines. The clipping levels are shown as both positive and negative amplitudes but in reality, they would be unipolar, the polarity depending on the read circuit design. Their effect in relation to the read signals, however, is as shown in FIG. 3.

Typical maximum values of the signals are five volts measured base-to-peak (5V. b-p). For purposes of illustration, the write high clipping level (that is used in read-after-write) is about 40 percent of the maximum value, or 2 volts. The read high clipping level is about 25 percent, or 1.4 volts. The low clipping level, used during both read and write, is 0.8 volts.

A higher clipping level is used during a write because a more critical read is required. The signal strength decreases after a write by as much as 10 percent of the written signal strength. The decrease is caused by the magnetic domains returning to a quiescent level after having been subjected to a magnitizing force that exceeded the saturation level of the medium.

The maximum peak 50 in FIG. 3 represents a read signal during a write of a binary one. It would be read as a valid binary one because it exceeds the write high clipping level. Later, during a read, the same signal might be decreased to the value shown by the dotted line 51. It would be accepted as valid data because it exceeds the read high clipping level and the low clipping level.

The bit pattern being written may cause a signal under-shoot such as the negative peak 52. During a write, it would be read as a binary one in the low clipping level register because it exceeds the low clipping level. The device would be programmed to rewrite the information by backing up and rewriting the block. Circuitry would be provided to prevent the device for cycling indefinitely because of a defective component that always caused an invalid write.

Figure 4:
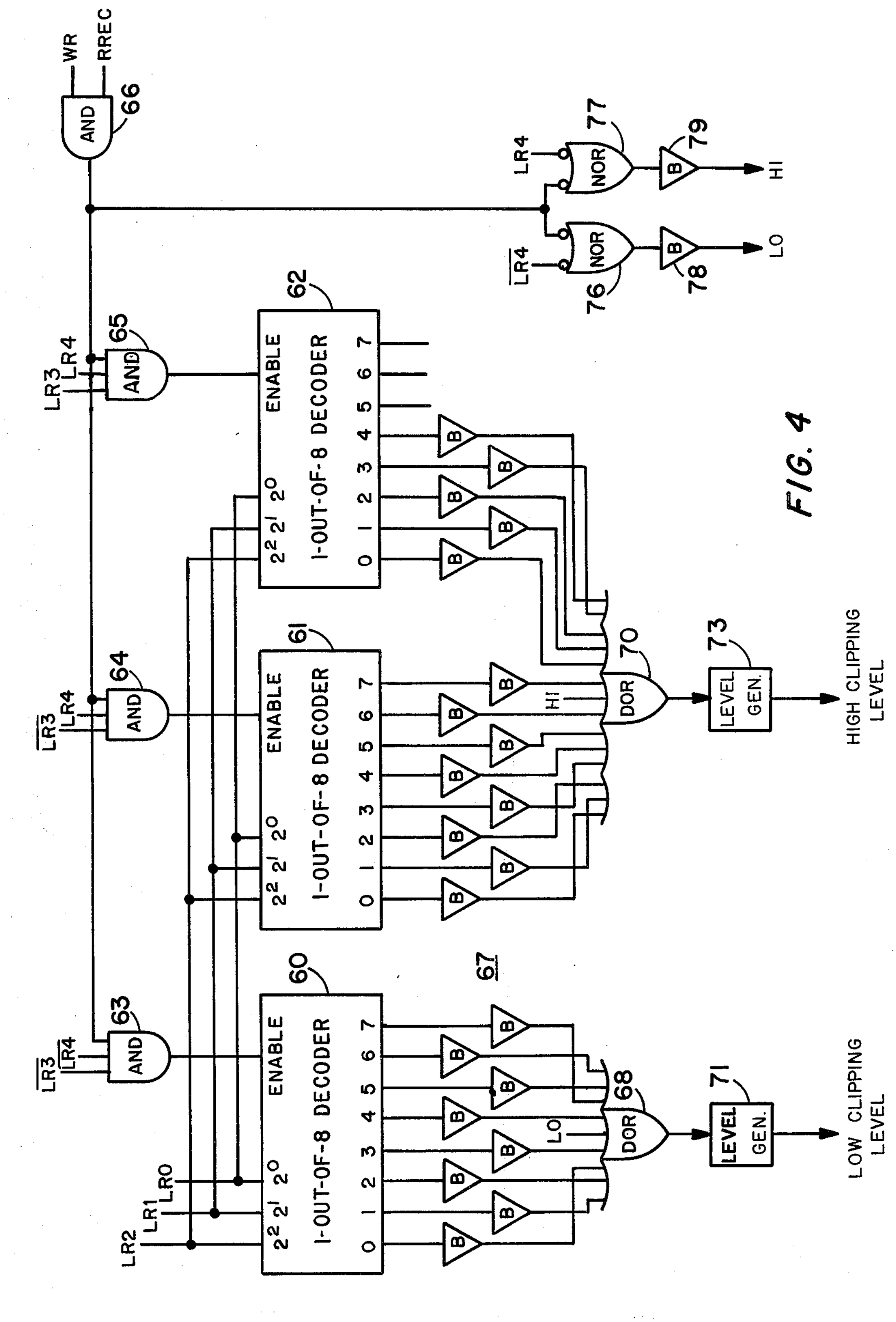
FIG. 4 is a logic diagram of an embodiment of decoder-drivers.

FIG. 4 is a logic diagram of an embodiment of the decoder-drivers 29 shown in FIG. 1. The three least significant bits, LR0-LR2, from the level register (28 FIG. 1) are coupled to three one-out-of-eight decoders 60, 61, and 62. Each decoder has an enable input terminal that is activated to produce a decoder output signal. The enable input signals are provided by the AND gates 63, 64, and 65 which are responsive to the two next more significant bits from the level register, LR3 and LR4, and a priming signal.

The priming signal is the output signal from an AND gate 66, which is activated by the concurrence of two signals, labelled WR and RREC. The signal WR is active when the device is executing a write. The mnemonic RREC stands for ReRead with Error Correction. Both signals originate in the controller (12 FIG. 1).

Therefore, when the RREC and WR signals are present, the bits from the level register are decoded to determine which clipping level is to be used. The five bits, LR0–LR4, are capable of specifying 32 different clipping levels but in the embodiment being described, only 21 are utilized, eight for the low and 13 for the high clipping level.

The most significant bit, LR4, indicates when set that the high clipping level is to be modified. When reset, it indicates the low clipping level is to be modified.

When LR4 is reset, LR3 is always reset. The output signal from the AND gate 66 when the bits LR3 and LR4 are both reset cause the output signal of the AND gate 63 to enable the decoder 60.

The decoders 60, 61, and 62, when enabled, produce an output signal on one of eight lines depending on the pattern of bits LR0–LR2. Such decoders are well known in the art and need not be described in detail. The output signal from the enabled decoder activates one of a plurality of buffer circuits 67. The output signals from the buffer circuits are set to a different voltage for each buffer.

The output signal of the buffer circuits 67 are coupled to the level generators 71 and 73 through diode OR gates 68 and 70, respectively. The level generator produces a clipping level determined by the voltage from the activated buffer circuit. The clipping levels are coupled to the respective peak detectors.

Figure 5:
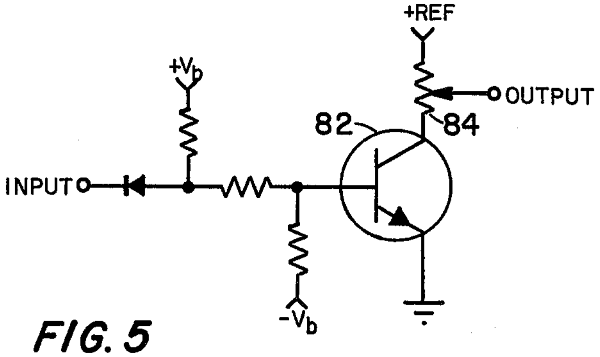
FIG. 5 is a schematic of a buffer with a variable output voltage.

An example of a buffer circuit is shown in FIG. 5. A low voltage corresponding to a binary zero at the input terminal of the circuit shown in FIG. 5 will cause the transistor 82 to be cut off so that the output signal will be equal to the positive reference voltage. When the input signal is a high voltage corresponding to a binary one, the transistor 82 will be turned on and the output signal will be a voltage between ground and the positive reference voltage depending on the setting of the output potentiometer 84.

Figure 6:
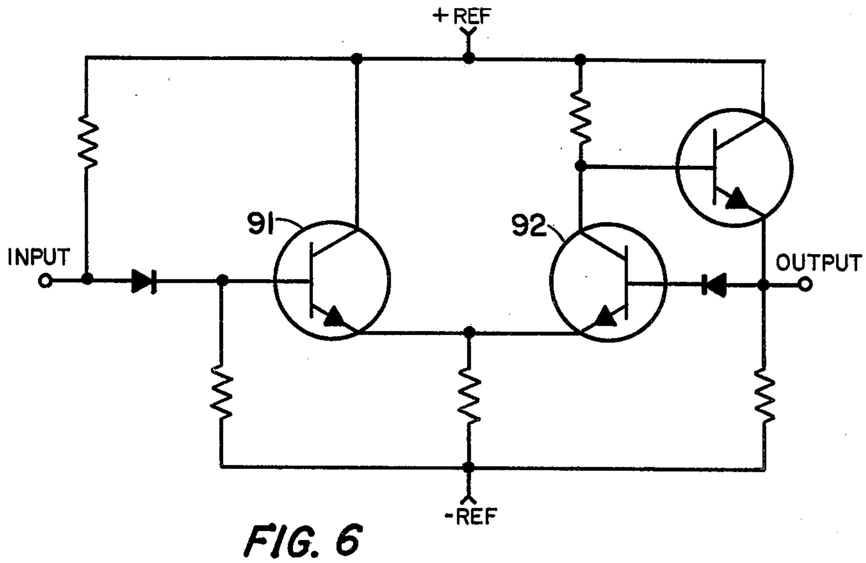
FIG. 6 is a schematic of a buffer-driver.

The output voltage from the buffer circuit is coupled through a diode OR gate to a level generator such as shown in FIG. 6. The transistors 91 and 92 are configured as a difference amplifier so that the output voltage at the collector of the transistor 92 is proportional to the difference between the input and output voltages. The output voltage will therefore assume a value equal to the input voltage. The output impedance of the generator is much less than that of the buffer circuit and consequently affected less by varying load conditions.

In FIG. 4, an additional input terminal is provided on each diode OR gate 68 and 70. In the embodiment illustrated, the signals on the OR gates 68 and 70 would be the normal low and high clipping levels from the buffer circuits 78 and 79, respectively.

The buffer circuits 78 and 79 are activated by the NOR gates 76 and 77, respectively. Both NOR gates are activated when the AND gate 66 is not activated. At such time, the clipping levels are at the "normal value" and do not depend on the contents of the level register.

When the AND gate 66 is activated, the clipping levels depend on the contents of the level register. When modifying the low clipping level, the high clipping level is maintained at its normal value to prevent interactions between the effects of varying both levels at the same time. When modifying the high clipping level, the low clipping level is maintained at its normal value for the same reason.

As described above, the LR4 bit in the level register is set when modifying the high clipping level. The complement, $\overline{LR4}$, is applied to an input terminal of the NOR gate 76 to activate the buffer circuit 78 to maintain the low clipping level at its normal value. When the LR4 bit is reset to modify the low clipping level, the NOR gate 77 is activated to maintain the high clipping level at its normal value via the buffer circuit 79.

An alternative way of varying the clipping levels with the contents of the level register 28 would be to use resistor ladder networks. The ladder network could be responsive to the decoder output signals or to the output signals of the level register directly. A disadvantage of ladder networks is that resistor values must be trimmed to obtain the desired levels.

Figure 7:
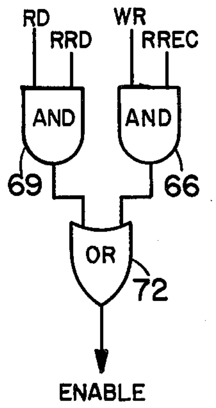
FIG. 7 is a logic diagram of an alternate enabling level generator.

The circuit shown in FIG. 4 can be used to reread invalid information at different clipping levels in order to recover valid information. FIG. 7 is a logic diagram of a circuit to replace the AND gate 66 in FIG. 4.

In FIG. 7, the AND gate 66 performs the same function as in FIG. 4, but its output signal is coupled to the AND gates 63–65 through an OR gate 72. Another AND gate 69 is also coupled to the OR gate 72 to provide an enabling signal during a read (RD signal) if the normal clipping levels are to be changed as indicated by a control signal RRD. The RD and RRD signals activate the AND gate 69 and the enabling signal via the OR gate 72.

Various other modifications and changes can be made to the illustrated embodiment within the scope and principle of the invention as claimed.

What is claimed is:

1. The combination comprising:

storage system means for storing information;

information reading means for converting the stored information to electrical signals, said reading means responsive to a voltage level for rejecting false information caused by noise signals having a level less than said voltage level; and means for selectively varying said voltage level, including register means for storing signals indicative of the desired voltage level;

decoding means responsive to the signals in the register means for producing second signals; and means responsive to the second signals for determining the voltage level to the information reading means.

2. The invention as claimed in claim 1 further including controllable gating means for storing a different desired value of signals in the register means.

3. The invention as claimed in claim 2 further including means for determining whether information was incorrectly read from said storage means.

4. The invention as claimed in claim 3 wherein said register means comprises a plurality of flip-flop means for storing binary signals representative of the desired voltage level.

* * * * *